US007225965B2

(12) United States Patent
Johansen

(10) Patent No.: US 7,225,965 B2
(45) Date of Patent: *Jun. 5, 2007

(54) MULTIPLE PROBE POWER SYSTEMS AND METHODS FOR ULTRASONIC WELDING

(75) Inventor: David K. Johansen, Lake in the Hills, IL (US)

(73) Assignee: Dukane Corporation, St. Charles, IL (US)

( * ) Notice: Subject to any disclaimer, the term of this patent is extended or adjusted under 35 U.S.C. 154(b) by 214 days.

This patent is subject to a terminal disclaimer.

(21) Appl. No.: 10/667,035

(22) Filed: Sep. 22, 2003

(65) Prior Publication Data

US 2005/0061848 A1 Mar. 24, 2005

(51) Int. Cl.
*B23K 1/06* (2006.01)
*B23K 5/20* (2006.01)
*C29C 65/00* (2006.01)

(52) U.S. Cl. .................. 228/1.1; 228/110.1; 156/73.1
(58) Field of Classification Search .................. None
See application file for complete search history.

(56) References Cited

U.S. PATENT DOCUMENTS

| | | | | |
|---|---|---|---|---|
| 2,995,689 A | * | 8/1961 | Scarpa | 318/37 |
| 3,029,766 A | * | 4/1962 | Jones | 228/33 |
| 3,559,257 A | * | 2/1971 | Lemelson | 29/33 P |
| 3,885,902 A | * | 5/1975 | Fujieda et al. | 431/1 |
| 4,064,462 A | | 12/1977 | Goehler et al. | |
| 4,131,505 A | | 12/1978 | Davis, Jr. | |
| 4,208,001 A | | 6/1980 | Martner | |
| 4,257,730 A | | 3/1981 | Kawakita | |
| 4,277,710 A | | 7/1981 | Harwood et al. | |
| 4,401,501 A | * | 8/1983 | Stumpf | 156/367 |
| 4,549,684 A | * | 10/1985 | Telly et al. | 228/110.1 |
| 4,696,425 A | * | 9/1987 | Landes | 228/1.1 |
| 4,746,051 A | * | 5/1988 | Peter | 228/102 |
| 4,838,639 A | | 6/1989 | Morankar et al. | |
| 4,914,290 A | | 4/1990 | Hilgart et al. | |

(Continued)

FOREIGN PATENT DOCUMENTS

EP 0 389 704 10/1990

OTHER PUBLICATIONS

"Hex Buffers/Logic-Level Down Converters High-Performance Silicon-Gate CMOS," Motorola Semiconductor Technical Data, Motorola, Inc. 1995, 6 pages.

(Continued)

*Primary Examiner*—Lynne R. Edmondson
(74) *Attorney, Agent, or Firm*—Nixon Peabody LLP

(57) ABSTRACT

An ultrasonic welding probe power supply for powering more than one ultrasonic welding probe with power is provided. The power supply is adapted to provide power only to one welding probe at a time. A ringdown period is monitored between termination of provision of power to a first probe and the initiation of provision of power to a second probe during which provision of power to the second probe is disabled. Circuitry is provided within an ultrasonic welding probe controller to monitor probe activity and to control the interval between termination of provision of power to one probe and the initiation of provision of power to a second probe so that efficient and safe switching is made among ultrasonic probes.

22 Claims, 13 Drawing Sheets

U.S. PATENT DOCUMENTS

| | | |
|---|---|---|
| 5,295,700 A | 3/1994 | Crews et al. |
| 5,798,599 A | 8/1998 | Harwood |
| 5,880,580 A | 3/1999 | Johansen |
| 6,251,203 B1 * | 6/2001 | Vala et al. ................. 156/73.1 |
| 2005/0061848 A1 | 3/2005 | Johansen |
| 2006/0011707 A1 * | 1/2006 | Johansen ................. 228/110.1 |
| 2006/0213952 A1 * | 9/2006 | Johansen .................... 228/1.1 |

OTHER PUBLICATIONS

European Search Report dated Dec. 20, 2006.

* cited by examiner

MULTIPLE PROBE POWER SYSTEMS AND METHODS FOR ULTRASONIC WELDING

FIELD OF THE INVENTION

This invention is directed generally to ultrasonic welding and is more particularly related to systems and methods for providing power to multiple ultrasonic welding probes.

BACKGROUND OF THE INVENTION

Ultrasonic welding is an efficient technique for joining component parts in manufacturing environments. Applications of ultrasonic welding include the welding of plastic parts and fabrics when manufacturing products such as automobile components, medical products, and hygiene products.

Manufacturers who employ ultrasonic welding may use several individual welding devices, or "probes," in a single manufacturing environment. Individual devices may be customized for particular welds or for use on particular components. It is desirable, from a cost standpoint and also given the motivation to conserve space in a manufacturing environment, to use a minimum of power supplies to power an appropriate number of ultrasonic probes.

To achieve maximum power transfer efficiency (of greater than approximately 90%) from an ultrasonic generator to an ultrasonic load, such as a probe, the generator must drive the ultrasonic load at the load's exact mechanical resonant frequency. Circuitry inside the generator allows the generator drive frequency to track the load resonant frequency, which drifts due to temperature variations and may also be caused by the aging characteristics of the ultrasonic transducer or driver.

Powering more than one ultrasonic load from one ultrasonic generator output at one time can cause an overload condition on the output of the generator, because it is not possible to match the resonant frequency of multiple probes exactly. The resonant frequencies of two probes will change over time because different ultrasonic probes age differently over time and the temperature changes they experience will not match over time. Thus, to power multiple probes from one generator output, the probes should be individually switched to the high voltage (typically greater than 1,000 Vrms) generator output. This may be accomplished by using multiple high-voltage relays, with one relay dedicated to each ultrasonic load.

SUMMARY OF THE INVENTION

According to one embodiment, a multiple probe controller is provided for sequencing control for multi-probe ultrasound welding systems. According to one embodiment of the present invention the multiple probe controller sequencer is integrated into power generating equipment for ultrasonic welding.

According to another embodiment of the present invention the multiple probe controller is a compact modular design contained in an independent enclosure providing the necessary connections to function with and control an ultrasonic welding system.

According to yet another embodiment of the present invention an independent master multiple probe controller enclosure mates with a slave multiple probe controller enclosure to add support for the control of additional ultrasound welding probes.

According to yet another embodiment of the present invention a multiple probe controller is used in conjunction with an automation controller to provide control signals as required to power a plurality to ultrasonic probes.

According to another embodiment of the present invention, a multiple probe power supply and controller allows weld times and weld amplitude levels to be assigned to multiple ultrasonic welding probes. Alternatively or additionally, welds may be specified by the overall weld energy required.

Power is provided to multiple ultrasonic welding probes such that only one probe is powered at a time from a single ultrasonic generator, with a change in the powered probe being enabled only after voltage at a first probe decreases to a safe level for a power change.

DETAILED DESCRIPTION OF THE ILLUSTRATED EMBODIMENT

Figure 1:
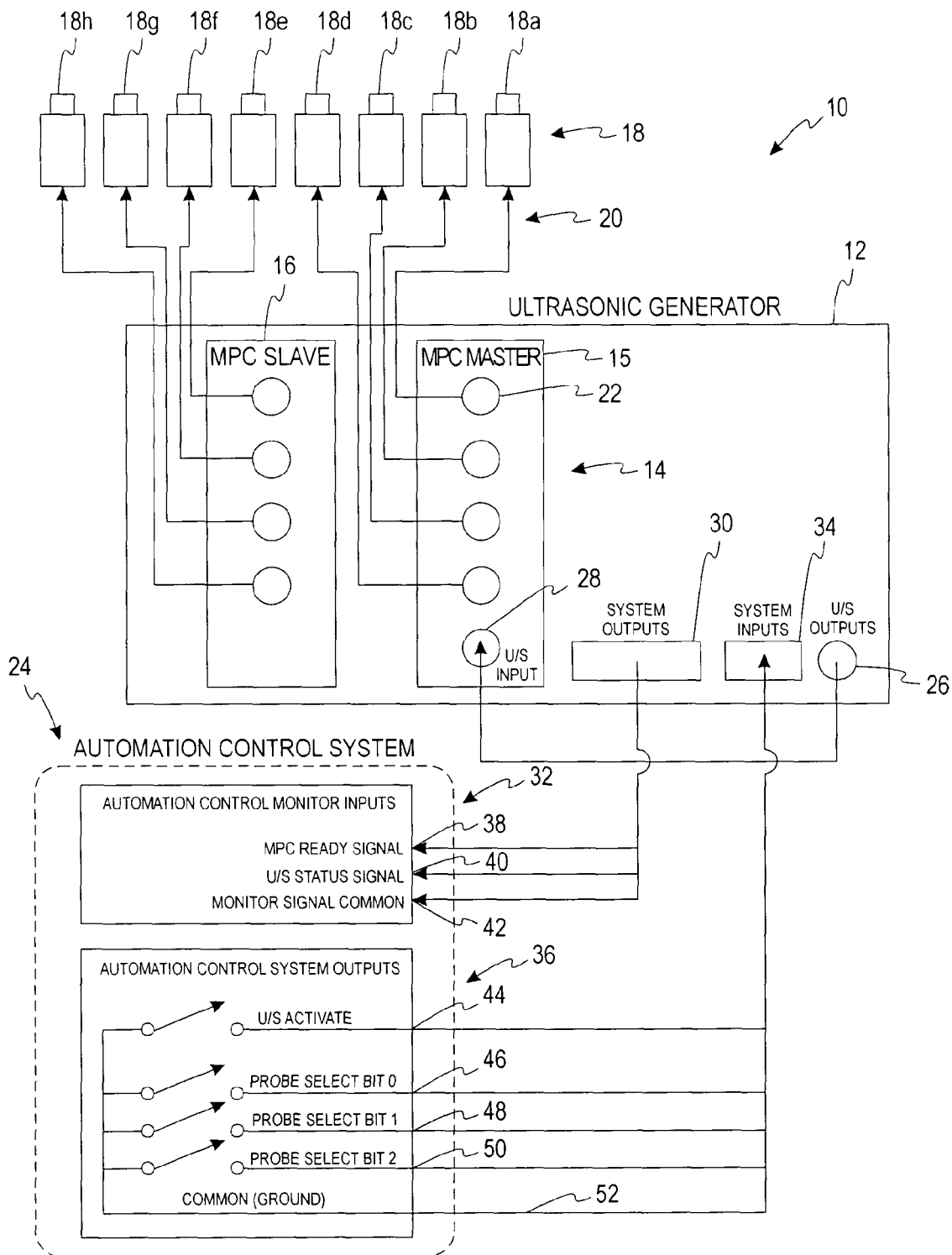
FIG. 1 is a block diagram showing an ultrasound welding system according to one embodiment of the present invention.

Turning now to FIG. 1, a block diagram of an ultrasound welding system 10 according to one embodiment of the present invention is shown. An ultrasonic generator 12 contains a multiple probe controller (MPC) 14. FIG. 1 shows the MPC 14 implemented as a master MPC unit 15 and a slave MPC unit 16. Each of the MPC units routes power to a number of ultrasonic probes 18*a*–*h* via probe connections 20 attached to ultrasonic power jacks 22. The ultrasonic generator 12 powers ultrasonic probes 18 according to signals received from an automation control system 24. The automation control system 24 is a type of selector input device that may be used with the present system. Alternatively, manual control of switching to request ultrasound probe selections and to request the activation and deactivation of ultrasound power may be used in some embodiments.

Power from the ultrasonic generator 12 is delivered from an ultrasonic power output 26 to an ultrasonic power input 28 provided on the master MPC unit 14. System outputs 30 of the ultrasonic generator 12 forward signals to automation control inputs 32 of the automation control system 24, and system inputs 34 of the ultrasonic generator 12 receive signals from automation control outputs 36 of the automation control system 24.

Signal inputs at the automation control system 24 include an MPC ready signal input 38, an ultrasound power status signal input 40, and a monitor signal common input 42. Signal outputs of the automation control system 24 include an ultrasound activation output 44, and probe selection bit outputs 46, 48, and 50. While three probe selection bits are shown in the embodiment of FIG. 1, more or fewer probe selection bits may be provided, depending on the number of ultrasonic probes 18 to be selected. For example, a fourth probe selection bit output may be provided to allow for selection of up to sixteen probes using a hexadecimal numbering code. The probe selection bits 46, 48, and 50 are binary weighted bits, with bit 0 being the least significant bit and bit 2 being the most significant bit. Using three bits, it is possible to select up to eight different ultrasonic probes. This method has the advantage of making it impossible for the automation control system 24 to select two probes simultaneously, as it is desirable to prevent activation of more than one probe selection relay at a time. A common (ground) connection 52 is also provided between the automation control system 24 and the ultrasonic generator 12. The functions of each of these signals will be understood upon reference to their descriptions, below.

Ultrasonic probes 18 for use with the present invention may include any type of ultrasound welding probe, including ultrasound welding probes optimized with tools for particular ultrasound welding applications. Ultrasound weld time, which may be controlled by a timer within the automation control system 24 or by a weld time controller provided within the ultrasonic generator 12 may be controlled on the basis of weld time, or may measure ultrasonic power and integrate watt-seconds to result in a particular amount of weld energy for the particular weld. According to one embodiment, the automation control system 24 may select which probe 18 will be used for a weld time and can also control the duration of a weld by sending activation signals from the ultrasound activation output 44 to the ultrasonic generator 12. An ultrasound status signal output may be supplied to the automation control system 24 to allow the automation control system 24 to time the actual duration of ultrasound output if very accurate weld times are required.

A weld timer within the ultrasonic generator 12 may have user-programmable windows to define acceptable welded parts. For example, the system could be programmed to weld parts by energy and the ultrasonic welding system 10 may be set to a weld energy of 500 Joules. A weld controller within the ultrasonic generator would control the ultrasound generator 12 to apply ultrasound until 500 Watt seconds of energy had been applied to the part, but a secondary time window or limit may be programmed to detect a malfunction in the process. In the example above, it might be typical for the part to draw 500 Watts of ultrasonic power when welding is correctly achieved, which would result in approximately a one-second cycle time. A time window may be programmed such that if the programmed energy level is achieved outside a pre-set time window (for example, in less than 0.5 second or greater than 2 seconds), the part may be flagged as a bad or suspect part and in some instances automation equipment could be used to sort the part into an appropriate part bin.

The ultrasonic welding system 10 allows for the provisioning of ultrasound power from the ultrasonic generator 12 to one ultrasonic probe 18 at a time. An MPC ready signal from the MPC 14 informs the automation control system 24 as to when it is possible to change the selection bits 46, 48, and 50 for a new ultrasonic probe 18 following the termination of power to another ultrasonic probe 18 and a ring-down period during which the ultrasonic probe stops vibrating.

Figure 2:
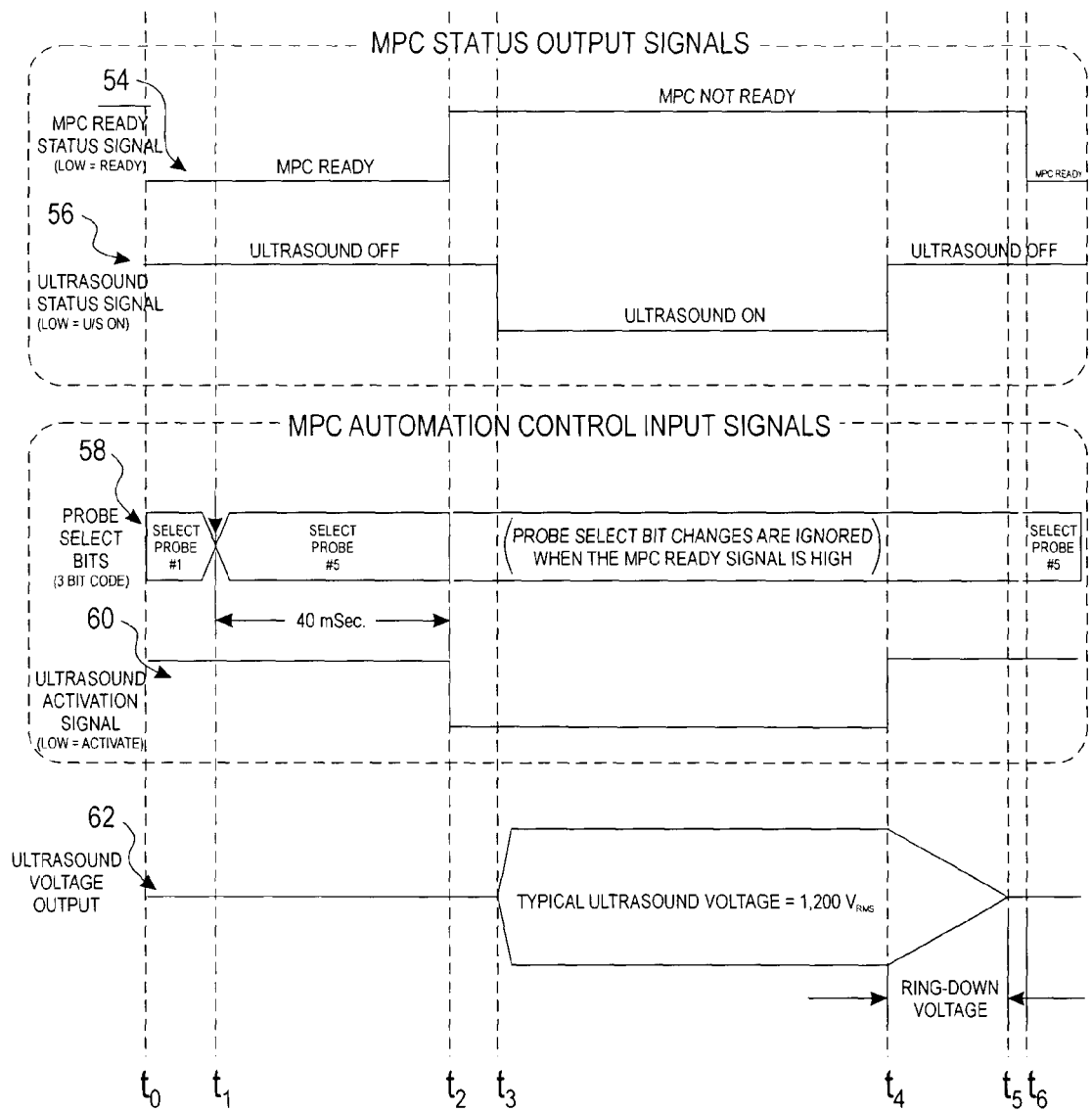
FIG. 2 is a signal diagram showing timing delays for the provision of ultrasound power to an ultrasound probe.

Referring now to FIG. 2, a timing diagram for an ultrasound welding system 10 according to one embodiment of the present invention is shown. An MPC ready status signal 54 is sent from the MPC 14 from the system outputs 30 of the ultrasonic generator to the MPC ready signal input 38 of the automation control system 24. The MPC ready status signal 54 provides an indication of when the MPC 14 is ready to provide power to a different ultrasonic probe 18. An ultrasound power status signal 56 is sent from the system outputs 30 of the ultrasonic generator 12 to the ultrasonic status signal input 40 of the automation control system 24. A probe selection signal 58—actually a graphical depiction of the outcome of the probe selection bits—shows the change over time of probe selection by the automation control system 24. An ultrasound activation signal 60 is sent from the ultrasound activation output 44 of the automation control system 24 to the system inputs 34 of the ultrasonic generator 12 and indicates when the automation control system 24 is attempting to initiate the provision of ultrasound power to the selected probe 18. An ultrasound voltage output signal 62 shows voltage in the probe connection 20 of the activated probe.

At the beginning, time $t_0$, of the time shown in FIG. 2, probe number one is selected and no power is being provided to the probes. Further, because the MPC ready status signal 54 is set to its ready state—low, as shown—the automation control system 24 is free to select another probe to power. A short time after $t_0$, at $t_1$, the probe selection is changed to select probe number five, as shown by the probe selection signal 58. Synchronous logic within the multiple probe controller 14 requires a delay between the selection of a new probe and the activation of ultrasound power. For example, in one embodiment synchronization within the multiple probe controller 14 requires that the automation control system 24 provide a minimum 40 ms delay for proper operation between $t_1$, when probe number five is selected, and $t_2$, when the ultrasound activation signal 60 changes from its high, inactivated state to its low, activate state. Substantially immediately upon the activation of the ultrasound activation signal 60, the MPC ready status signal 54 changes from its low, ready state to its high, not-ready state. A short time later, at $t_3$, the ultrasound power status signal 56 changes from its high state, showing that ultrasound power is not being provided, to its low state, showing that ultrasound power is being provided. The time delay between $t_2$ and $t_3$ is due to the fact that the MPC 14 does not operate on the same synchronous logic as the automation control system 24. The initiation of ultrasonic power occurs according to the synchronous logic of the MPC and is not directly controlled by the automation control system 24.

Ultrasound power activation continues until $t_4$, when the ultrasound activation signal 60 changes from its low, activation state to its high, inactivated state. Substantially simultaneously with this state transition, the ultrasound power status signal 56 changes from its low state, indicating that ultrasound power is being provided, to its high state, indicating that the provisioning of ultrasound power has been terminated. The ultrasound power status signal 56 changes simultaneously with a deactivation signal from the ultrasound activation signal 60 because deactivation signals do not proceed through the synchronous logic of the MPC 14.

Following $t_4$, a ringdown period occurs in the ultrasound voltage output signal 62, until $t_5$. The ringdown time is variable based on the characteristics of the particular probe 16 being powered-down, including characteristics such as ultrasonic stack characteristics and clamping pressure of the probe. Following the ringdown period, at $t_6$, the MPC ready status signal changes from high (not ready) to low (ready), indicating that probe selections may be accepted by the MPC unit(s) 14. Again, the time delay between $t_5$ and $t_6$ is due to the asynchronous relationship between the ringdown time and the synchronous logic of the MPC 14. Between $t_2$ and $t_6$, any changes in the probe selection signal 41 will be ignored by the master MPC 15 or slave MPC 16 because the MPC ready status signal 54 is set to high (not ready).

Figure 3:
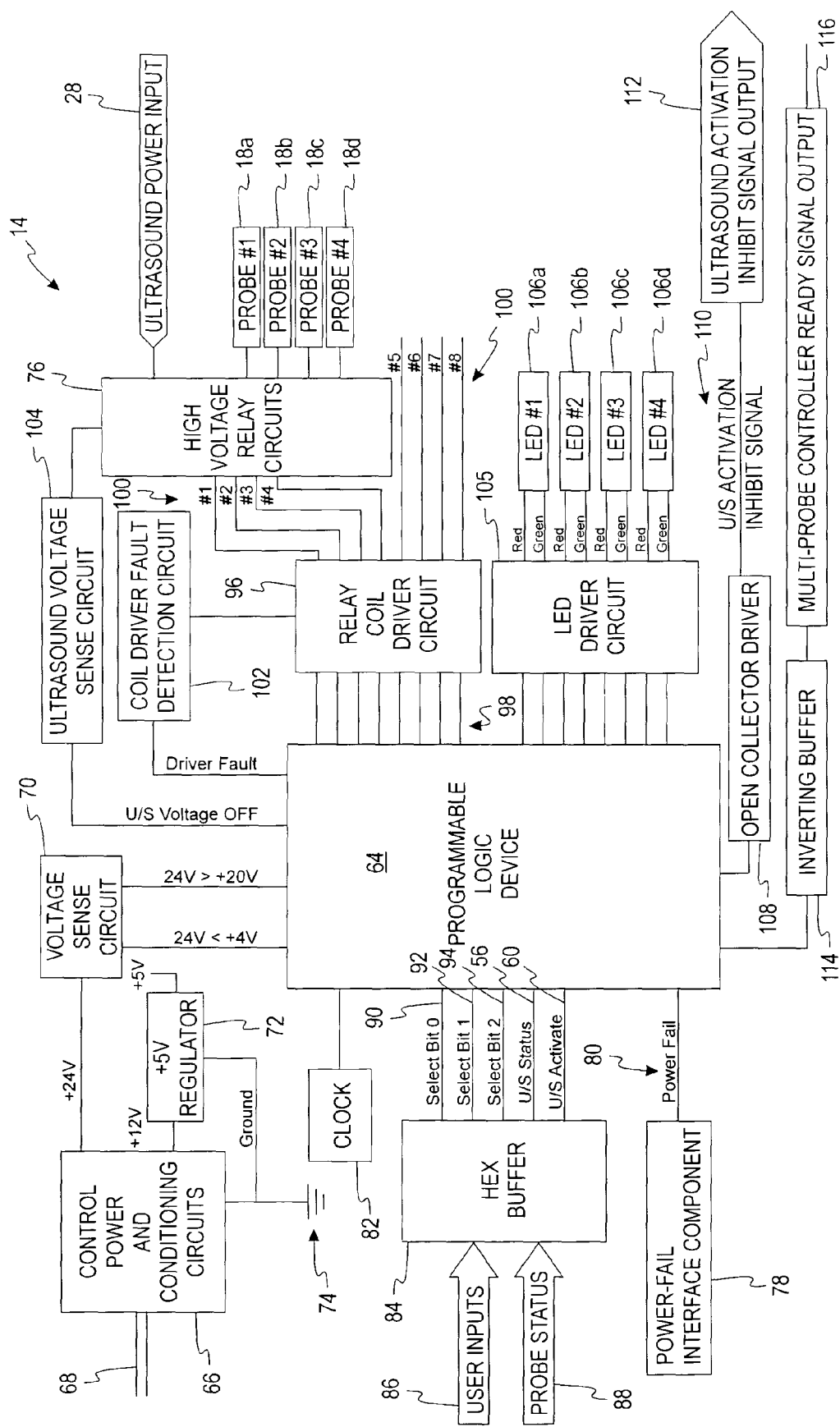
FIG. 3 is a block diagram of multiple probe controller logic according to one embodiment of the present invention.

Turning now to FIG. 3 a block diagram schematic of a multiple probe controller 14 according to one embodiment of the present invention is shown. A programmable logic device 64 implements digital logic for the MPC 14. The circuitry of the multiple probe controller 14 is powered by one or more control power and conditioning circuits 66 which, according to one embodiment of the present invention, accept input power from a power supply conduit 68 and supplies a nominal 24 volts DC to a voltage sense circuit 70 and 12 volts DC to a 5 volt regulator circuit 72. Local power conditioning filter capacitors (not shown) are included on the control power supply outputs so the functionality of the relay control circuitry—described in further detail below— is not compromised due to any line power variations or even total power outages.

The regulator circuit 72, in turn, powers the digital control logic components. The regulator circuit 72 is connected to ground 74. The control power and conditioning circuits 66 also contain hold-up capacitors to maintain sufficient power during power failure or brown out conditions to ensure safe control of transition states. Power is provided to ultrasonic probes via relays 76. The sense circuit 70 provides the programmable logic device 64 with input to detect a malfunction of the relay control voltage which will require the inhibition of ultrasound welding voltage to protect the contacts of relays 76. The relays 76 receive ultrasound power from the ultrasonic power input 28 and route the power to ultrasound probes 16 based on which probe has been selected. According to one embodiment of the present invention the relays 76 have a maximum rating of 5000 Vrms@5 A. Power-fail interface components 78 include an external module with circuitry that monitors the magnitude of input AC power and provides a power fail signal 80 if the AC line level is less than an under-voltage trip setting.

The programmable logic device 64 receives a timing signal from a clock 82 for timing and state transitions. According to one embodiment, the clock 82 runs at a rate of approximately 32 kHz. A hex buffer 84 receives user inputs 86 and probe status inputs 88, which according to one embodiment are shifted down to a 5 volt logic level for the programmable logic device 64. The user inputs 86 may be input into the system inputs 34 of the ultrasonic generator 12, as shown in FIG. 1, and may be inputs from an automation control system 24. The probe status inputs 88 route the ultrasound status signal 56, shown in FIG. 2, from the ultrasonic generator 12 to the multiple probe controller 14. In the embodiment shown in FIG. 1, the ultrasound status signal 56 is routed within the chassis of the ultrasonic generator 12 to the master multiple probe controller unit 15, which is provided within the chassis of the ultrasonic generator. The ultrasound status signal is used by the multiple probe controller state logic 122 (discussed below with respect to FIG. 4) and is also used to control the state of light-emitting diode (LED) indicators in LED driver logic 164 (also discussed below with respect to FIG. 4). In the embodiment shown in FIG. 3, five connections are made between the hex buffer 84 and the programmable logic device 64. Connections for selection bit signals zero, one, and two 90, 92, and 94 control which ultrasound probe is selected for operation. The ultrasound power status signal 56 indicates the status of ultrasound probes to the programmable logic device 64. The ultrasound activation signal 60 signals the programmable logic device 64 to initiate ultrasound probe operation.

In the embodiment of FIG. 3, the programmable logic device 64 outputs control signals to a relay coil driver circuit 96. In the shown embodiment, the programmable logic device 64 outputs the control signals to the relay coil driver circuit 96 through relay coil driver control signal conduits 98. The relay driver circuit 96 drives outputs through relay control conduits 100 to control relay circuits 76, which in turn provide power from an ultrasound power input 28 to ultrasound probes 16a–16d. In the embodiment shown in FIG. 3, the relay coil driver circuit 96 is also equipped to provide relay coil driver control signals for four additional ultrasound probes, as shown by the additional relay control signal conduits 100. The relay circuits to control the additional probes may be provided within the same cabinet as the circuitry shown in FIG. 3, or they may be provided in a separate housing.

Two voltage fault devices provide inputs to the programmable logic device 64. The coil driver fault detection circuit 102 detects faults within the relay coil driver circuit 96 and checks that only one relay coil is activated. A fault condition is signaled if a relay coil driver failure—i.e., a short—occurs that would activate two or more probes simultaneously. An ultrasound voltage sense circuit 104 samples the ultrasound welding voltage at the relays 76 to detect when the ultrasound welding voltage reaches or is at a safe, (i.e., near zero) level. According to one embodiment, the ultrasound voltage sense circuit 104 monitoring the magnitude of the ultrasound voltage and having a voltage trip point set to less than approximately 24 $V_{ac}$. The output of the ultrasound voltage sense circuit 104 is similar to the ultrasound status signal 56, shown in FIG. 2, with the output of the ultrasound voltage sense circuit 104 remaining active (i.e., in an ultrasound-on state) longer by an amount equal to the ring-down time for an ultrasonic probe.

In conjunction with the control of the relay coil driver circuit 96, the programmable logic device 64 also outputs indicator signals to an LED driver circuit 105 which in turn drives indicator LEDs 106a–d. According to one embodiment of the present invention, the indicator LEDs 106 are bi-color LEDs. According to one embodiment, the LEDs 106 may illuminate green when the corresponding probe channel is selected and change to red when the ultrasound voltage is activated. If additional probes are implemented then an additional driver circuit 105 and bi-color LEDs 106 may be used.

The programmable logic device 64 also outputs signals to an open collector driver 108 which, in turn, forwards an ultrasound activation inhibit signal 110 to an ultrasound activation inhibit output 112. Another output to an inverting buffer 114 supplies a multiple probe controller ready signal output 116, which becomes true (on, sinking current) when control changes can be accepted and false (off, open) when control changes will be ignored. Thus, a disconnected cable sends a not ready (false) signal to the automation controller.

Figure 4:
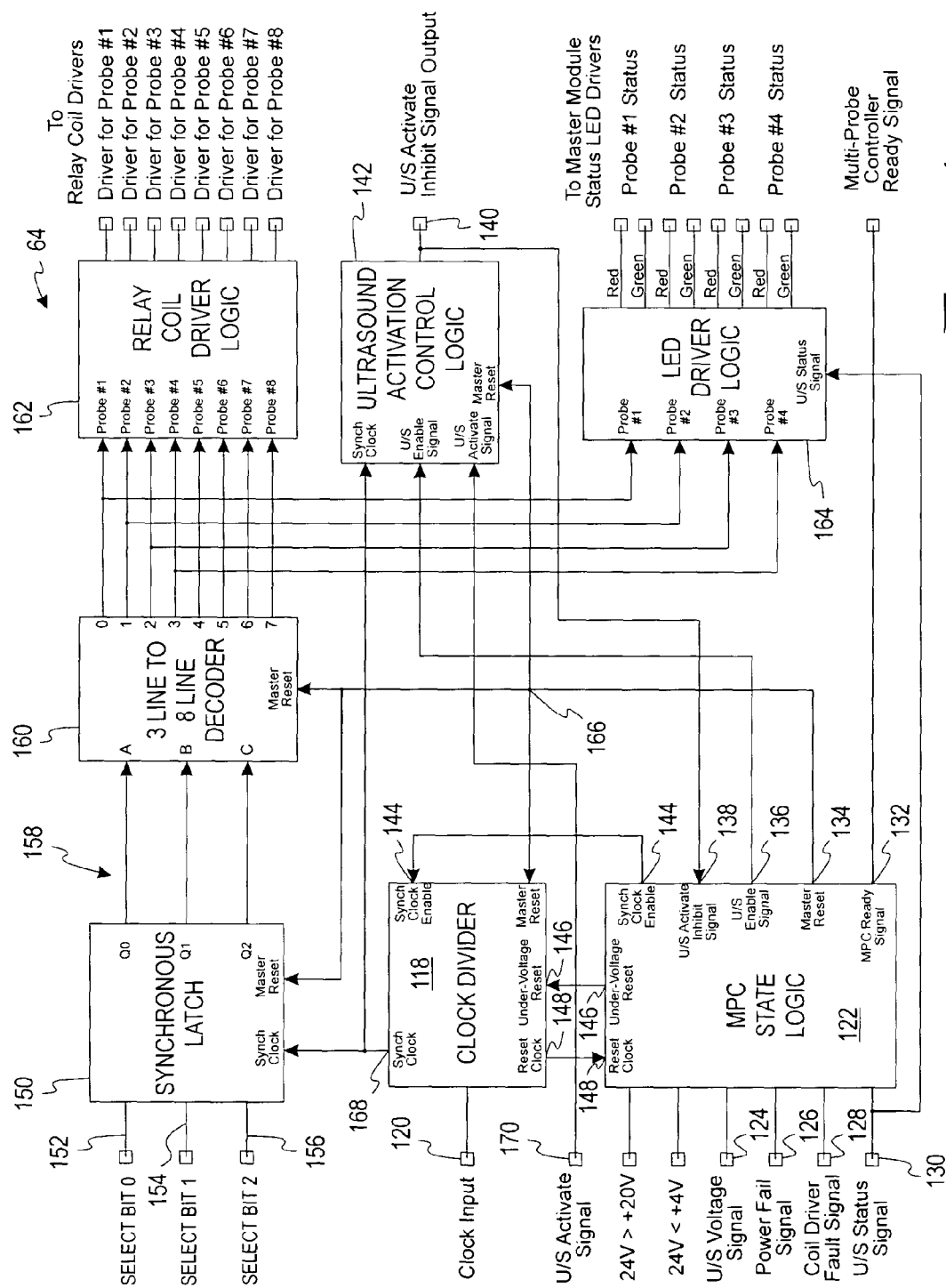
FIG. 4 is a block diagram of programmable logic device operation for a multiple probe controller according to one embodiment of the present invention.

Turning now to FIG. 4 a functional block diagram showing the logic of a programmable logic device 64 of FIG. 3 according to one embodiment of the present invention is illustrated. The programmable logic device 64 is clocked by a clock divider 118 which provides an internal clock from the 32 kHz clock input 120. The multiple probe controller state logic block 122 receives an ultrasound voltage sense signal from the ultrasound voltage sense circuit 104 at an ultrasound voltage signal input 124, a power fail signal 80 from the power fail interface components 78 at a power fail signal input 126, a coil driver fault signal at a coil driver fault signal input 128 from the coil driver fault detection circuit 102, and the ultrasound power status signal 56 from the probe status inputs 88 at an ultrasound power status signal input 130, and is synchronously controlled by the internal clock. The multiple probe controller state logic block 122 also outputs the multiple probe controller ready signal 54, indicating that the MPC 14 is ready to accept ultrasound probe change instructions, at a multiple probe controller ready signal output 132. The multiple probe controller state logic block 122 also supplies a master reset signal from a master reset output 134, provides an ultrasound enable signal from an ultrasound enable output 136, and accepts an ultrasound activation inhibit input signal at an ultrasound activation inhibit input 138. The ultrasound activation inhibit signal 110 originates at the logical ultrasound activate inhibit output 140 of the ultrasound activation control logic 142. Clock synchronization enabling signals travel through clock synchronization connections 144, under-voltage reset connections 146, and clock reset connections 148.

Probe selection inputs through which a user or an automation control system 24 chooses which ultrasonic probe to operate are clocked and latched by a synchronous latch 150. In the embodiment shown in FIG. 4, the synchronous latch 150 accepts selection inputs at selection bit inputs 152, 154, and 156, respectively corresponding to selection bits zero, one, and two, which in turn are sent via selection decoding conduits 158 to a 3-to-8 line decoder 160. This logic is used to select one of 8 probes with 3 input control bits and according to one embodiment makes it impossible to select more than one probe simultaneously. In the embodiment of FIG. 4, the decoder 160 outputs probe selection signals to the relay coil driver logic 120 and the LED driver logic 162. The multiple probe controller state logic block 122 is responsible for controlling the ultrasound activation logic in response to timing state considerations (as shown FIGS. 2 and 5–10) and the various voltage sensing inputs. The relay coil driver logic 162 generates relay control signals input into the relay coil driver circuit 96 (shown in FIG. 3), and the LED driver logic 164 generates LED control signals input into the LED driver circuit 105. The ultrasound activation control logic 142 generates the ultrasound activation inhibit signal 110 (shown in FIG. 3).

In the embodiment of FIG. 4, the synchronous latch 150, the decoder 160, the clock divider logic 118, and the ultrasound activation control logic 142 are all resettable via a master reset conduit 166 which originates from the multiple probe controller state logic 122 and enables a centralized reset of the ultrasound controller. The synchronous latch 150 and the ultrasound activation control logic 142 receive clock synchronization signals from a synch clock output 168 of the clock divider 118. The ultrasound activation control logic 142 accepts the ultrasound activation signal 60 at an ultrasound activation input 170, accepts the ultrasound enable signal from the ultrasound enable signal output 136 of the MPC state logic 122, and also generates an ultrasound activation inhibit signal 110 at the ultrasound activation inhibit signal output 140. The ultrasound activation inhibit signal 110 is sent from the ultrasound activation inhibit signal output 140 to the ultrasound activation inhibit signal input 138 of the MPC state logic 122.

The master and slave multiple probe controllers 15 and 16 operate to monitor ultrasound probe status and to enact probe status changes requested by users of the system or by an automation control system 24. The signal traces that follow illustrate the operation of an ultrasound welding system according to some embodiments of the present invention.

Figure 5:
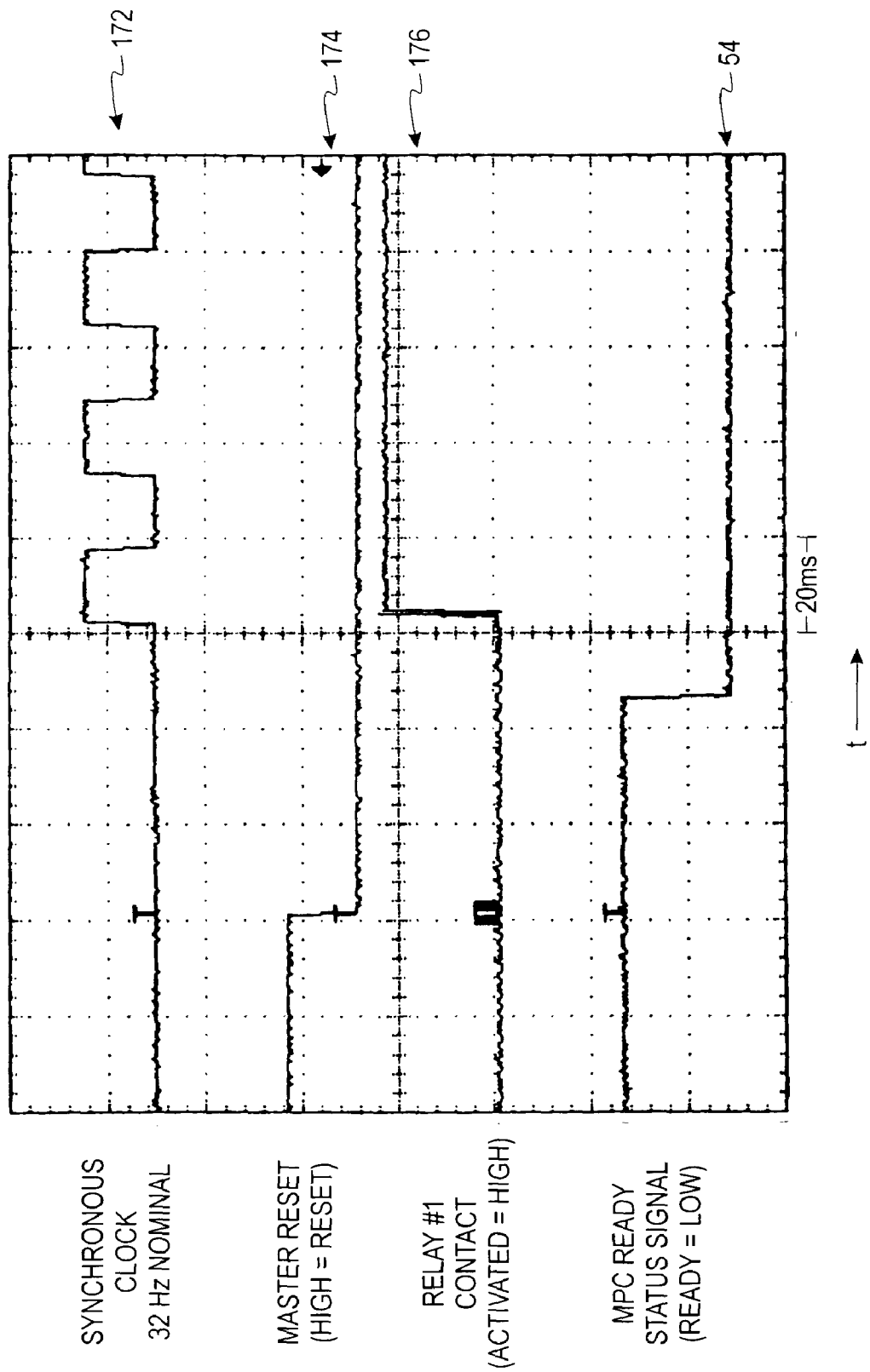
FIG. 5 is a signal trace illustrating a power up timing sequence according to one embodiment of the present invention.

Referring now to FIG. 5, a signal trace of a power-up timing sequence according to one embodiment of the present invention is shown. Time is displayed along the x-axis, with each dotted interval representing a 20 ms interval. The power-up timing sequence is initiated when an ultrasound welding system is powered on. During power up and reset conditions, the multiple probe controller 14 initiates a master reset signal, deactivates all relay contacts, and inhibits the synchronous clock. In the embodiment shown in FIG. 5, the synchronous clock signal trace 172 shows that the synchronous clock, operating in this embodiment at a rate of approximately 30 Hz, begins oscillating approximately 60 ms after a master reset signal 174 switches from its reset state, shown by a high signal, to its non-reset state, shown by a low signal. The multiple probe controller-ready status signal 54 switches to its low, or ready, state approximately 45 ms after the master reset signal 174 switches from its high, or reset state, to its low, non-reset state. In the embodiment shown in FIG. 5, the master reset signal 174 stays in the high state for greater than 40 ms after powerup before switching to the low, non-reset state. When the synchronous clock signal 172 is enabled, a first relay contact signal 176 changes from its low, off state, to its high, on state, enabled by the first synchronous clock rising edge. At this point, the relays 76 have received the signal to activate the first relay to connect the ultrasound power input 28 to the first ultrasound probe 18a, as shown in FIG. 3.

Figure 6:
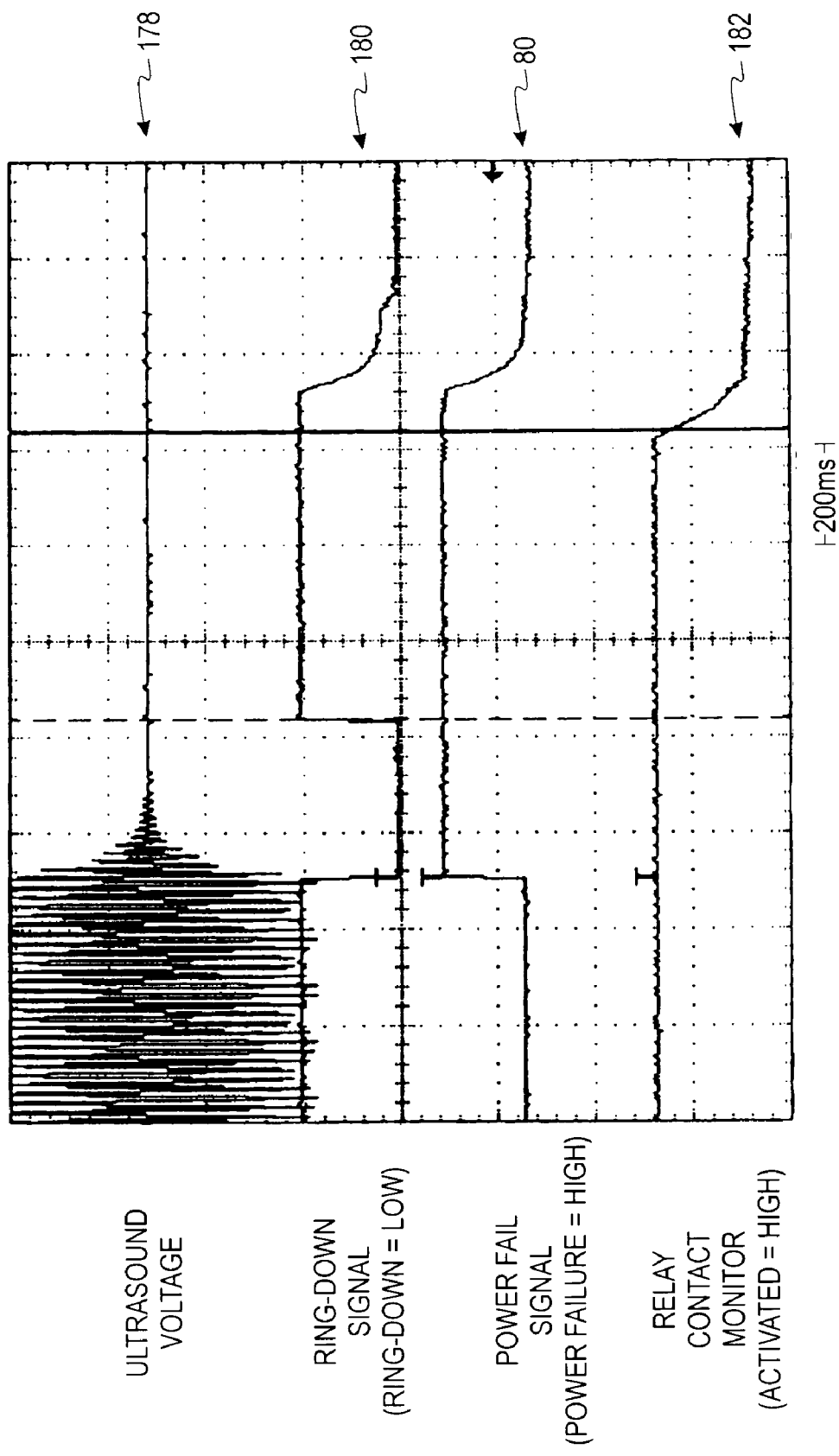
FIG. 6 is a signal trace illustrating a power failure timing sequence according to one embodiment of the present invention.

Referring now to FIG. 6, a signal trace of a power-failure timing sequence according to one embodiment of the present invention is shown. In the signal trace of FIG. 6, each dotted-line time interval is approximately 200 ms. During a power failure, the contacts of an active relay should remain operable until the ultrasound voltage level drops to a safe level. FIG. 6 illustrates the timing sequence when an input power failure occurs during a welding cycle in which an ultrasound output is activated. In the embodiment shown in FIG. 6, an ultrasound voltage 178 at an ultrasound probe is on at the beginning of the displayed time. A ring-down signal 180 is high at the beginning of the displayed time, in a non-ring-down state. A power fail signal 80 is low, indicating no power failure. A relay contact monitor signal 182 is high, showing that a relay 76 corresponding to an ultrasonic probe is activated. Upon power failure, about 500 ms after the start of the waveform capture of FIG. 6, the power fail signal 80 switches to high, indicating a power failure has occurred. The ultrasound voltage output 178 decays to near zero volts in approximately 350 ms after the power failure. The ring-down signal 180 goes low to indicate a ring-down status during which the power to the ultrasound probe is decaying to a safe level, and then switches back to a logic high and remains high for about 650 ms before the local supply voltage collapses on the ultrasound voltage sense circuit 104, shown in FIG. 3. The ring-down signal functions normally, with about 600 ms of power supply hold-up time margin for ultrasonic stacks or probes that have a longer ring-down time characteristic. A relay contact monitor signal 182 indicates that a relay is closed (high), which is the normal state during a weld cycle. The relay contact monitor signal 144 remains high throughout the power failure, showing that the relay contact remains closed for approximately 600 ms after the ring-down time, until the relay coil voltage collapses.

Figure 7:
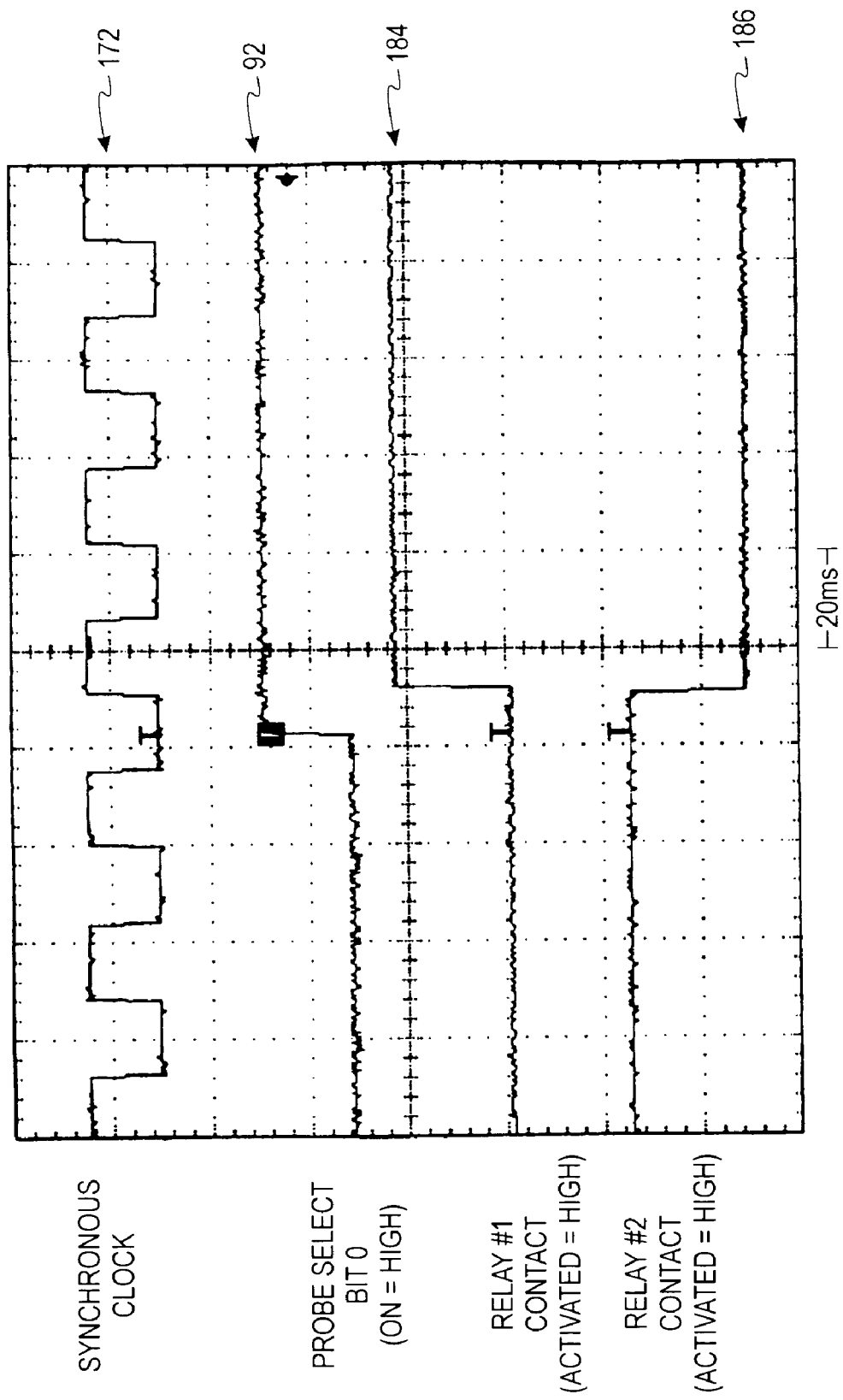
FIG. 7 is a signal trace illustrating probe relay selection timing, switching probe 2 to probe 1 according to one embodiment of the present invention.

Referring now to FIG. 7 a signal trace of a probe relay selection timing sequence according to one embodiment of the present invention is shown. The multiple probe controller ensures that the selection of a new active relay—and therefore, a new welding probe—is accomplished in a clocked and synchronized manner. A synchronous clock signal trace 172 is shown in this embodiment operating at approximately 32 Hz. When the probe select bit zero signal 92 switches from low, corresponding to the selection of a second ultrasonic probe 18b, to high, corresponding to the selection of the first ultrasonic probe 18a, asynchronously about 10 milliseconds before the synchronous clock edge, a first relay switches on to provide power to the first ultrasonic probe as shown by the first relay signal 184 and a second relay switches off simultaneously, as shown by the second relay signal 186, at the next positive-going synchronous clock edge. The synchronous clock signal 172 is inhibited (off) when ultrasound power is switched on, so relay switching changes are not possible without the clock because relay switching changes are linked to clock state changes. During this time, signal changes on the probe selection inputs are ignored.

Figure 8:
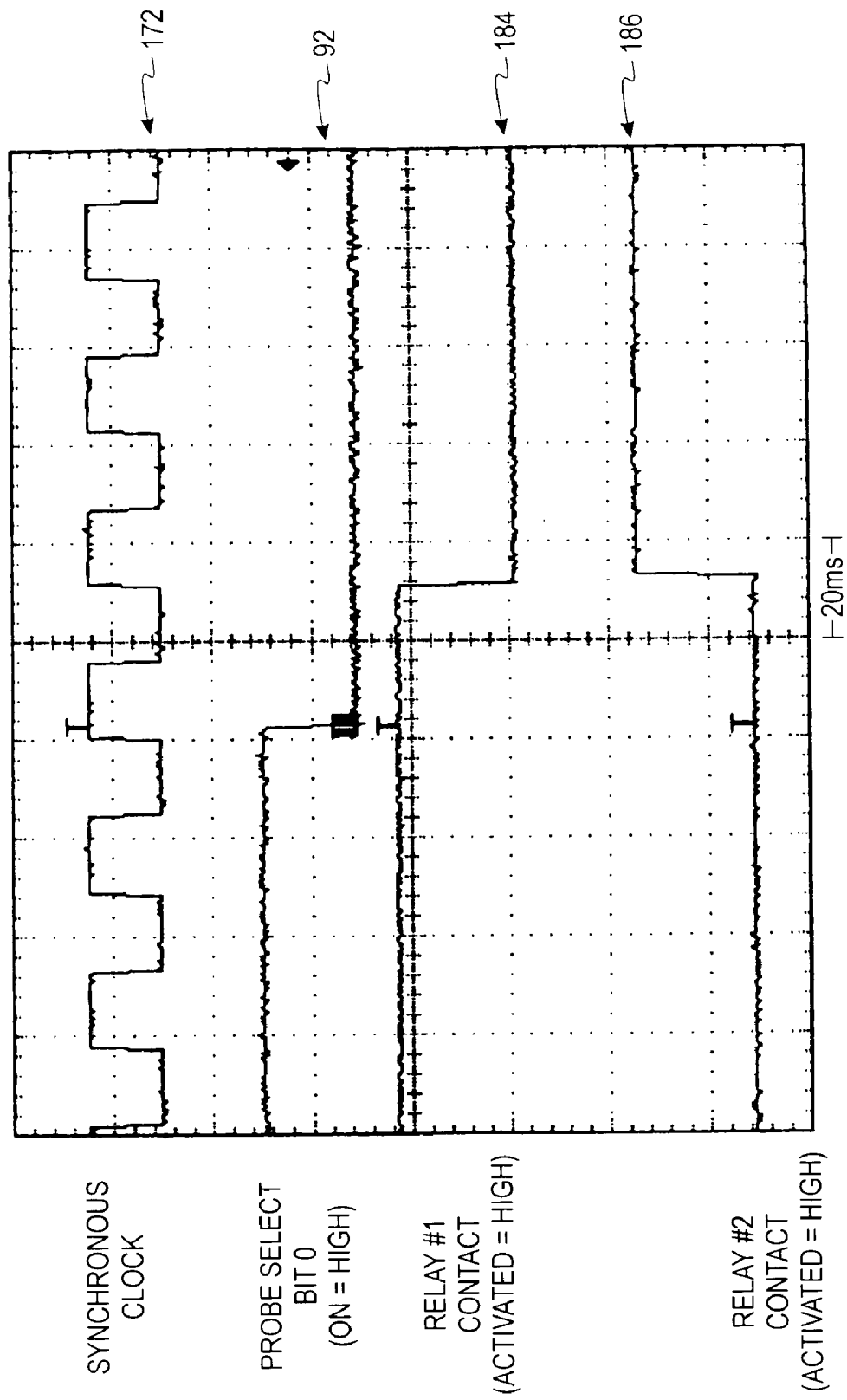
FIG. 8 is a signal trace illustrating probe relay selection timing, switching probe 1 to probe 2 according to one embodiment of the present invention.

Referring now to FIG. 8 a signal trace of a probe relay selection timing sequence according to one embodiment of the present invention is shown. In the embodiment shown in FIG. 8, a synchronous clock signal 172 operates at approximately 32 Hz. The probe selection bit zero signal 92 as received by the multiple probe controller 14 from a user selection device or from an automation control system 24 is also shown. In the signal trace of FIG. 8, a high signal for selection bit zero corresponds to the selection of a first ultrasound probe, and a low signal for selection bit zero corresponds to selection of a second ultrasound probe. When the probe selection bit zero signal 92 changes from its high state, corresponding to the selection of a first ultrasound probe, to a low state, corresponding to the selection of a second ultrasound probe, the first relay contact signal 184 changes from an activated or high state to a deactivated or low state on the next upward-going edge of the synchronous clock signal 172. A second relay contact signal 186 changes from a deactivated or low state to an activated or high state at the same upward-going edge of the synchronous clock signal 172. In this particular example, there is an asynchronous delay time of about 25 ms from the change of the probe select bit signal 92 to the rising edge of the synchronous clock 172 that initiates the relay selection change. It is to be understood that while changes are activated on upward-going clock edges in the embodiment shown in FIG. 8, in other embodiments changes may be activated on downward-going clock edges as may be desirable for design considerations.

Figure 9:
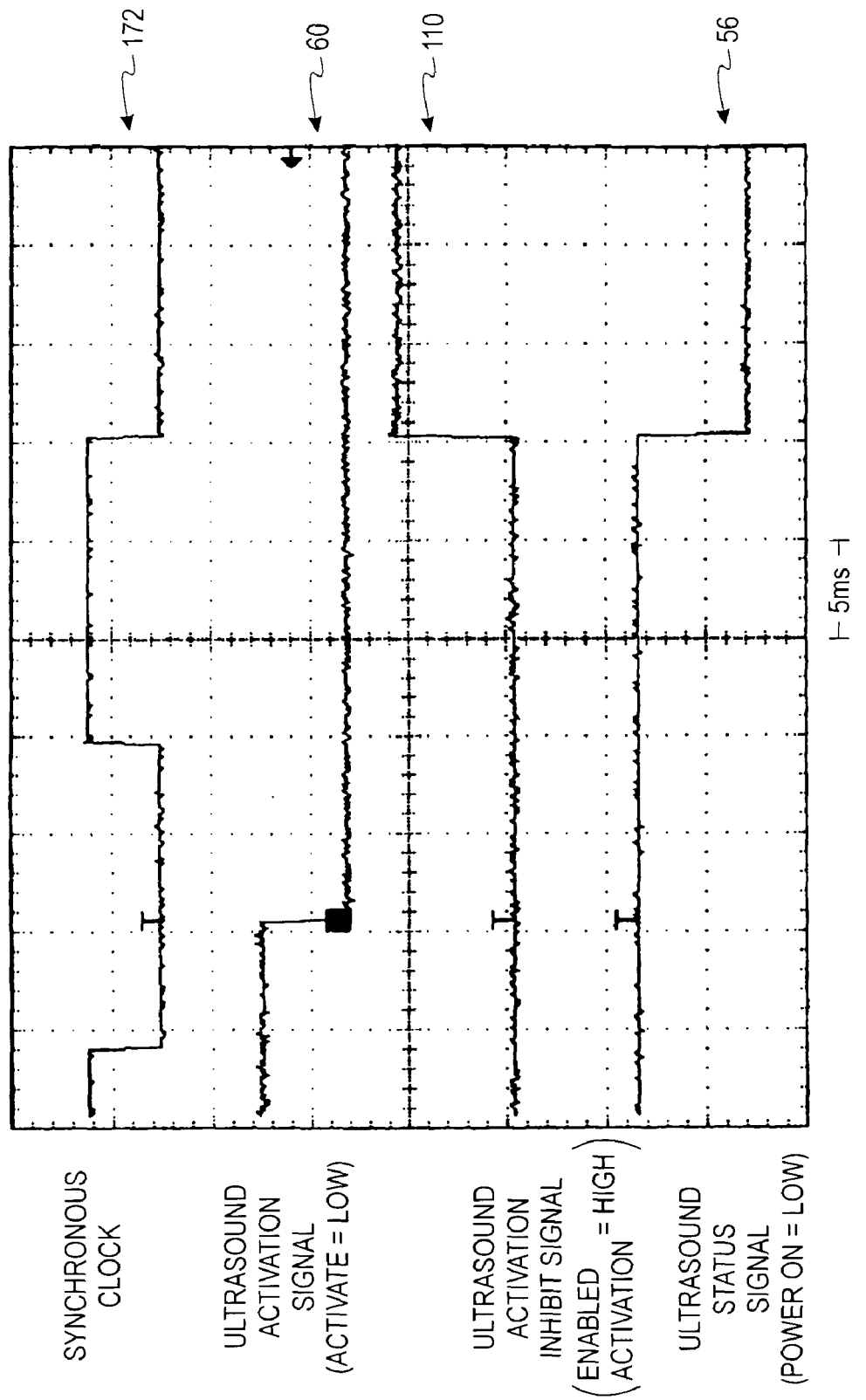
FIG. 9 is a signal trace illustrating ultrasound activation timing according to one embodiment of the present invention.

Referring now to FIG. 9, a signal trace of an ultrasound activation timing sequence according to one embodiment of the present invention is shown. This figure shows the ultrasound power activation synchronous timing sequence used to activate ultrasound power to a probe that has been previously selected. While in the shown embodiment the probe selection logic, shown in FIGS. 7 and 8, uses positive-going clock edges of the synchronous clock to switch states and select a different relay, the ultrasound activation logic, illustrated in FIG. 9, uses the negative-going edge of the synchronous clock for activation.

In FIG. 9, the time axis shows 5 ms for every dotted interval. A synchronous clock signal 172 shows the synchronous clock operating at approximately 32 Hz. The ultrasound activation signal 60 is high when no activation request is being made and low when an activation request is made. The ultrasound activation signal 60 entering into the MPC logic is asynchronous with the MPC logic and may occur at any time. The ultrasound activation inhibit signal 110 is synchronous with the MPC logic and it delays activation of ultrasound power until the first negative clock edge occurs. For example, in FIG. 9, there is approximately a 25 ms delay from the state change of the ultrasound activation signal 60 until the first negative clock edge occurs, which is when the ultrasound activation inhibit signal 110 switches to its high (active or enabled) state at which point ultrasound power may be supplied, as shown by the ultrasound power status signal 56, which switches to its low state to show that power is on.

To illustrate the synchronous logic safeguards, suppose an automation control system 24 changed the probe selection bits at the same instant that the ultrasound activation signal 60 changed. The new probe relay would be selected on the first positive-going clock edge, as shown in FIGS. 7 and 8. According to one embodiment, the activation time specification for the relay circuits 52 (shown in FIG. 3) is a maximum of 5 ms, so the relay contacts should be closed for at least 10 ms before the negative-going clock edge activates ultrasound output through the selected relay to the selected ultrasonic probe. Activation of ultrasound power and changing probe selection bits simultaneously is not a recommend procedure in this embodiment, because if a negative-going clock edge occurs first, the probe selection bits will not have a positive-going clock edge to effect the probe selection. No positive-going clock edge would be encountered in this case because the synchronous clock signal 172 is inhibited when ultrasound power activates. For proper operation, an automation control system 24 receives an MPC ready status indication at the MPC ready signal input 38 (shown in FIG. 1). Upon receipt of an MPC ready status indication, the automation control system 24 can select the desired probe using the probe selection bit outputs 46, 48, and 50 (shown in FIG. 1), then wait at least 40 ms before switching the ultrasound activation signal 60 on to start the welding cycle.

In order for an ultrasound activation request from an ultrasound sequencing device or a user to be acted upon, the activation inhibit signal 110 must be enabled, in its active high state. This allows activation of an ultrasound voltage output only via the synchronous logic circuitry. Referring to FIG. 9, the ultrasound activation signal 60 switches low to signal a request to initiate a weld cycle. The ultrasound activation inhibit signal 110 switches from a low, ultrasound power disabling state, to a high, ultrasound power enabling state on the next negative synchronous clock edge. This change disables the synchronous clock during the weld cycle. An ultrasound power status signal 56 switches from high, indicating no ultrasound power is being provided, to low, indicating that ultrasound output is being provided for the weld cycle.

Figure 10:
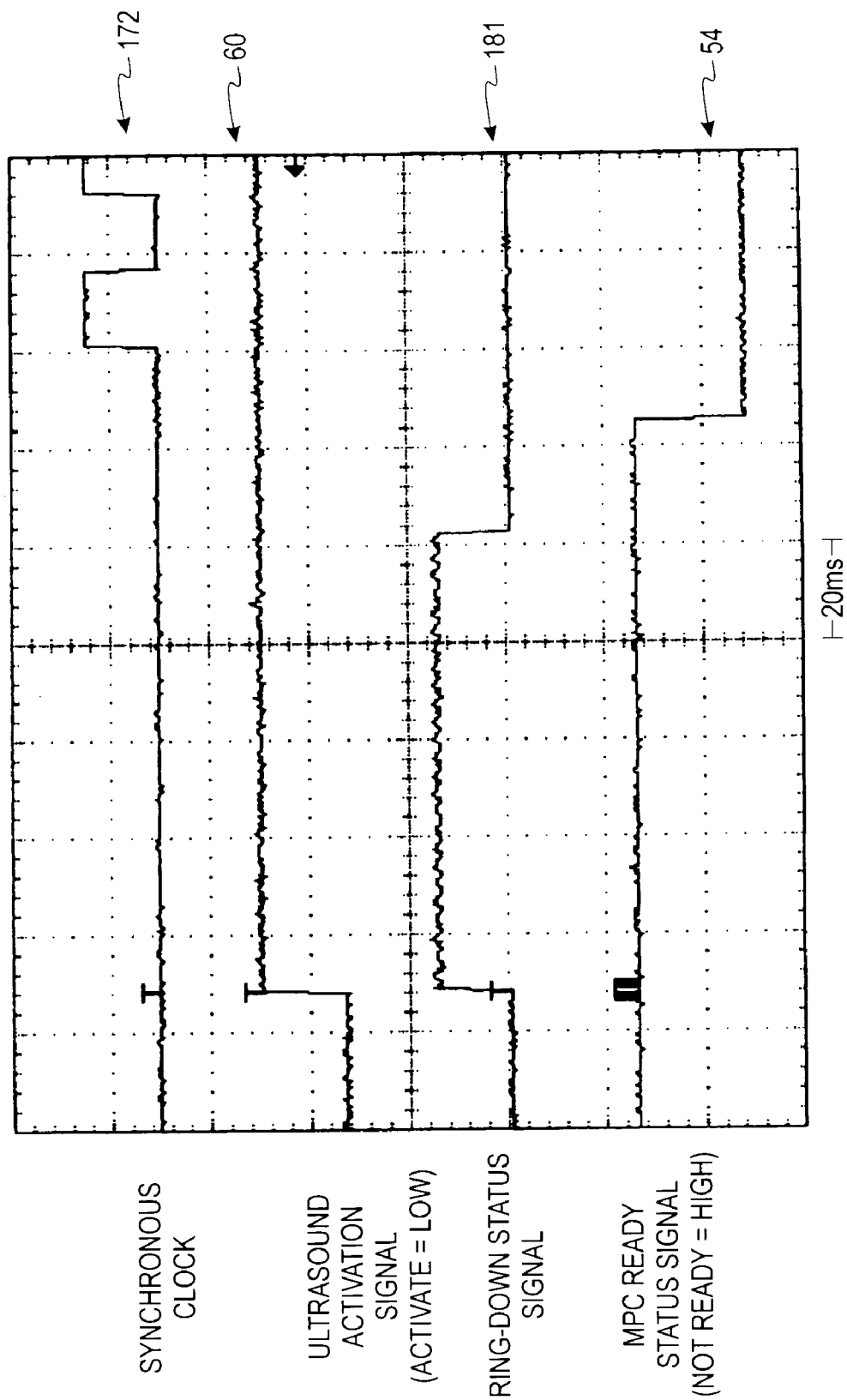
FIG. 10 is a signal trace illustrating ultrasound deactivation timing according to one embodiment of the present invention.

Referring now to FIG. 10, a signal trace of an ultrasound deactivation timing sequence according to one embodiment of the present invention is shown. The ultrasound deactivation timing sequence handles the power-down logic for an ultrasound probe and ensures that power will not be supplied to a newly-selected ultrasound probe until operation and power consumption by an operating ultrasound probe has ceased. The synchronous clock signal 172 shows that the clock is not operational while the MPC ready status signal 54 indicates the multiple probe controller is not prepared to provide power to a newly-selected ultrasound probe. When the ultrasound activation signal 60 switches from low, indicating that an ultrasound probe is activated, to high, indicating that power to the ultrasound probe has been switched off, the ring-down status signal 181 switches from low, showing that no ring-down is in effect, to high, indicating that the ultrasound probe that is being disabled is in a ring-down state during which the ultrasound probe is allowed to stop vibrating and the ultrasound voltage reaches a safe level for probe selection changes to occur. The ring-down status signal 181 shown in FIG. 10 is captured from a ring-down signal test point available on a master circuit board of a multiple probe controller. In contrast, the ring-down signal 180 of FIG. 6 is captured on an output pin directly on the programmable logic device 64, shown in FIG. 3. Though in the examples given the logics of these outputs are inverted from one another, they are derived from the same output signal of the programmable logic device 64. In the embodiment shown in FIG. 10, the ring-down status signal 181 activates for about 90 milliseconds after the deactivation of the ultrasound voltage and prevents any further ultrasound voltage output or probe switching during that time. The multiple probe controller ready status signal 54 continues in the not-ready state (high) until after the ring-down is over and then the synchronous clock 172 begins to function after the multiple probe controller ready status signal 54 switches to its low (ready) state. In the illustrated embodiment, ring-down signals are determined based on signals generated by the ultrasound voltage sense circuit 104, shown in FIG. 3.

The use of synchronous digital logic eliminates nearly all the timing requirements that the automation control system 24 must observe. According to some embodiments, the only timing requirement is that the probe selection must occur (when the multiple probe controller 14 is ready) at least a set time—for example, 40 ms—before ultrasound power is activated. The synchronous logic of the multiple probe controller 14 does introduce some timing uncertainty that occurs with the external ultrasound activation signal, which is asynchronous to the internal logic in some embodiments. Using an internal (integrated) weld timer will allow for synchronized logics and eliminate this timing uncertainty.

Figure 11:
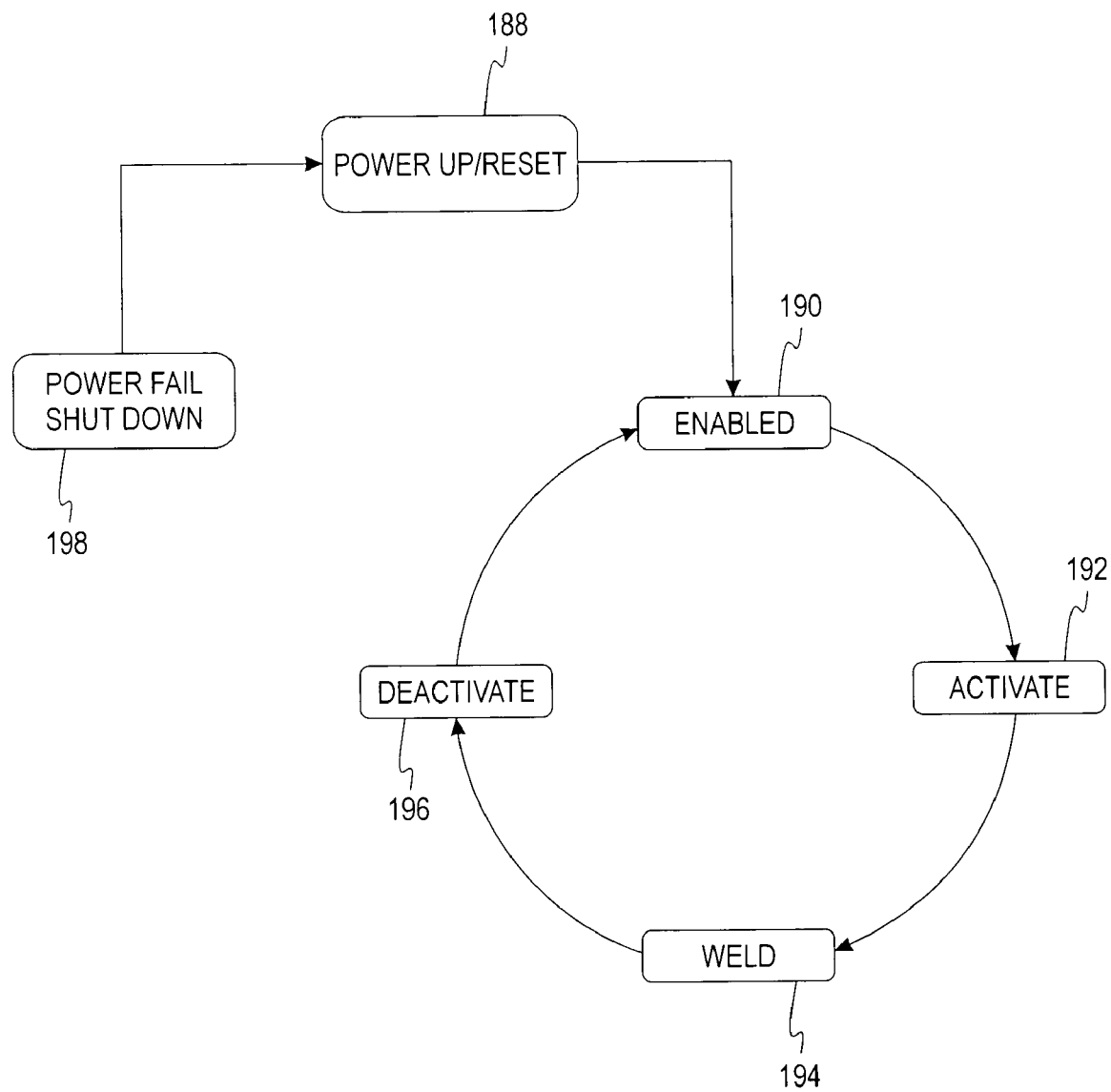
FIG. 11 is a state transition diagram for the operation of the multiple probe controller according to one embodiment of the present invention.

Turning now to FIG. 11, a state transition diagram is illustrated which shows the general sequence of events with respect to the aforementioned signal traces. Upon powerup or reset, as shown at block 188, transition is made to the enabled state at block 190, in which welding is inhibited but a probe relay selection can be made. This state is shown in FIGS. 7 and 8, as discussed above. When the probe relay selection is made, transition is made to the activate state, shown at block 192, as illustrated above at FIG. 9, followed by a transition to the welding state 194 which is represented by the final section of the signal trace of FIG. 9. When the weld duration is complete, transition is made to the deactivate state 196 (as shown in FIG. 10) until the ultrasound voltage is at a safe level such that transition can be made to the enabled state 190 to continue the probe selection and welding cycle. If the power fails or is shut down transition is made to the power fail state 198, as shown in FIG. 6, until a power up or reset occurs.

Figure 12:
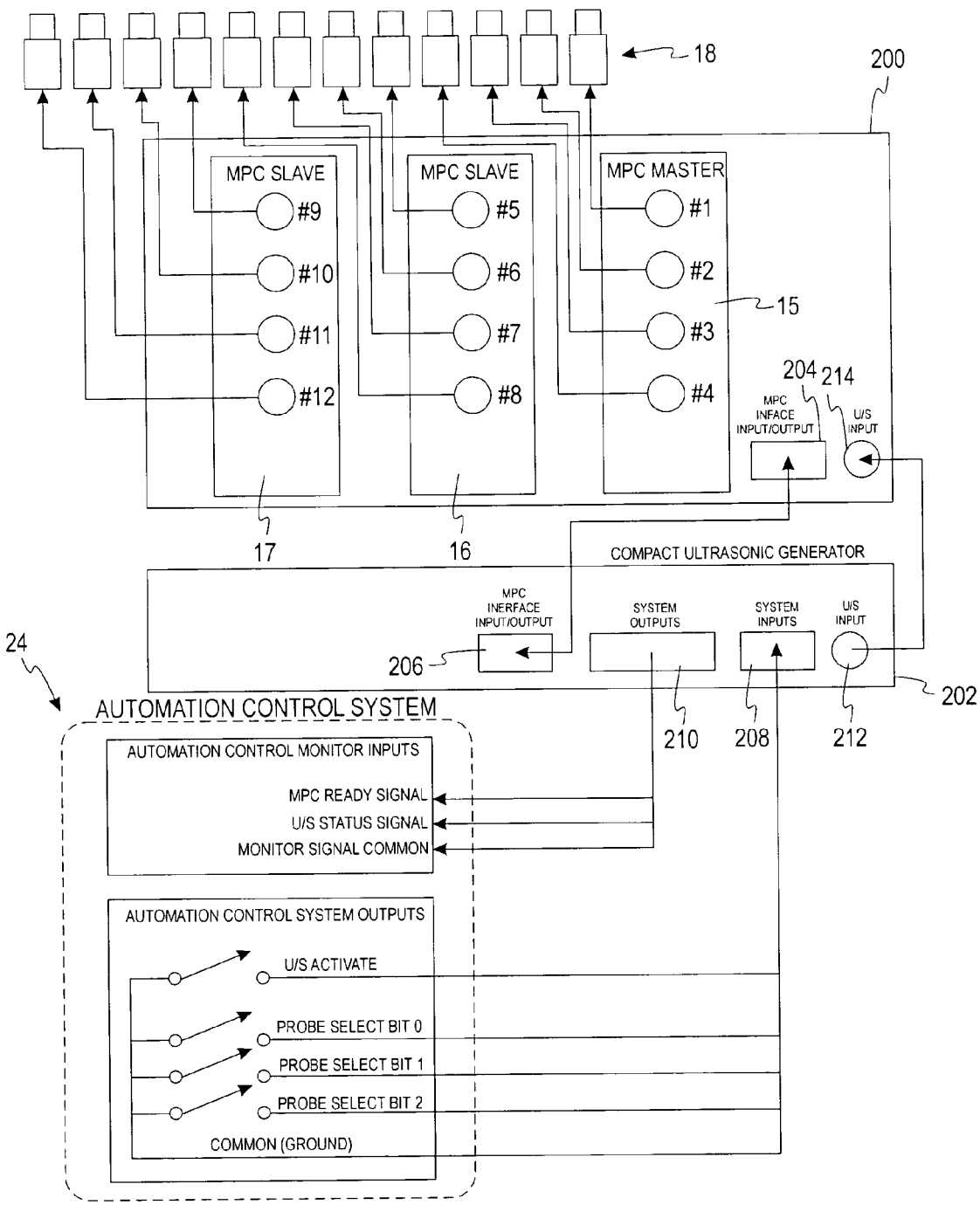
FIG. 12 is a block diagram showing a master-and-slave construction for a multiple probe controller according to one embodiment of the present invention.

An alternative embodiment of the present invention, in which a separate multiple probe controller chassis 200 is connected to a compact ultrasonic generator 202, is shown in FIG. 12. The multiple probe controller chassis 200 receives ultrasound power from the generator 202 and receives and sends control signals at an MPC interface input/output 204, which is connected to an ultrasonic generator MPC interface input/output 206. System signals from an automation control system 24 are received at system inputs 208 of the ultrasonic generator 202 and system signals are sent from the ultrasonic generator 202 to the automation control system 24 from system outputs 210. Ultrasound power is routed from an ultrasound output 212 of the ultrasonic generator 202 to an ultrasound input 214 of the multiple probe controller chassis 200. A master multiple probe controller 15 and two slave multiple probe controllers 16 and 17 are provided to route power to a total of twelve ultrasonic probes 18. While four ultrasonic probes 18 have been shown connected to the master multiple probe controller 15 and to each of the slave modules 16 and 17, it is to be appreciated that more or fewer ultrasound probes may be connected to each module as required by particular implementations of the present invention. Further, more than two slave modules may be connected to a single master multiple probe controller 15, either through direct connections to the master multiple probe controller, or through downstream links to intermediate slave modules.

Figure 13:
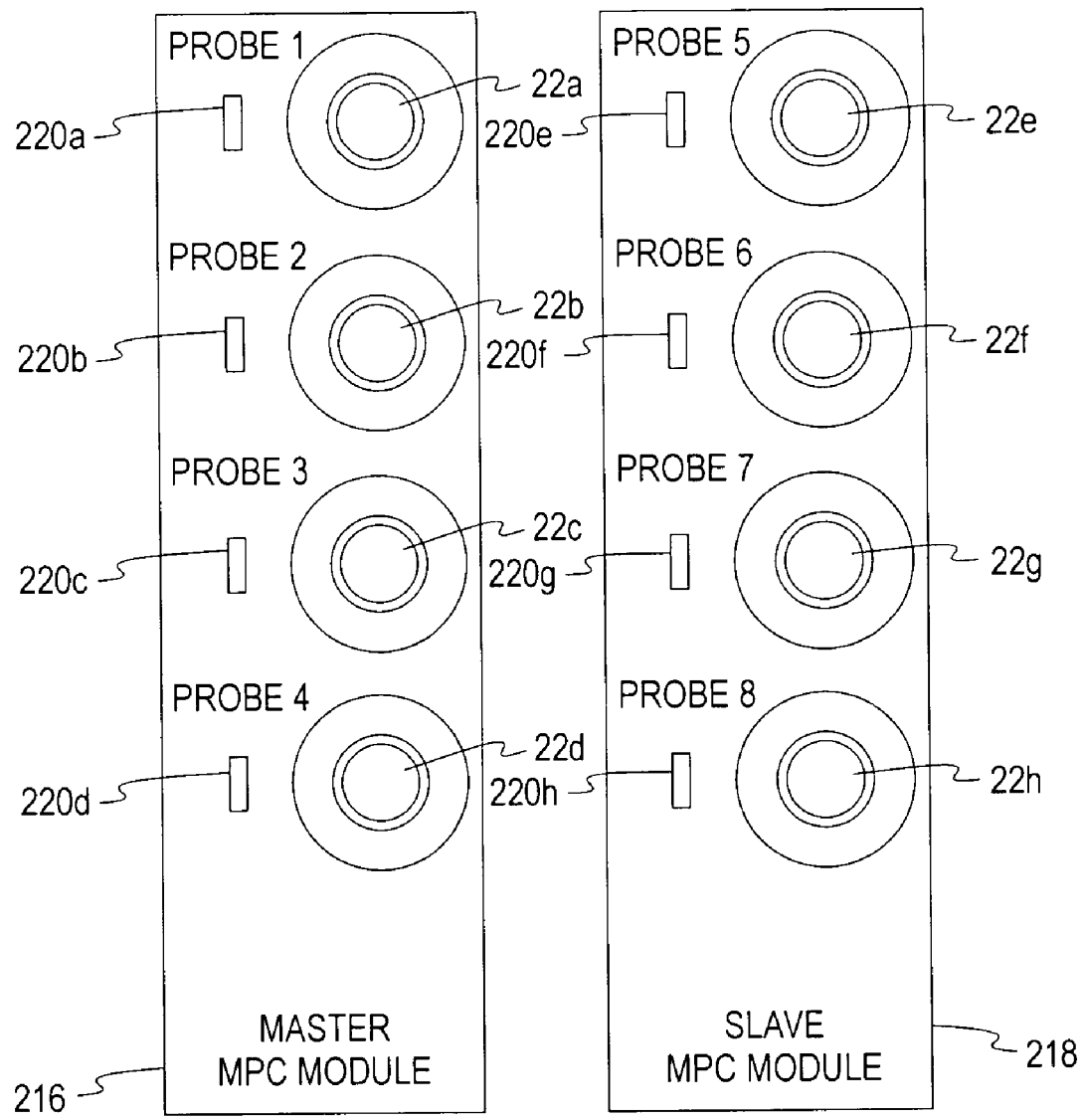
FIG. 13 is a front view of ultrasound probe connection panels according to one embodiment of the present invention.

Ultrasonic probes may be connected to multiple probe controllers and slave modules according to the present invention via ultrasonic probe connection panels. Turning to FIG. 13, a master ultrasonic probe connection panel 216 and a slave ultrasonic probe connection panel 218 according to one embodiment of the present invention are shown. The master ultrasonic probe connection panel 216 has four ultrasound probe jacks 22*a*–*d* and four associated bi-color LEDs 220*a*–*d*. The slave ultrasonic probe connection panel 218 has four ultrasound probe jacks 22*e*–*h*, which connect to ultrasound welding cables and four associated bi-color LEDs 220*e*–*h*, which indicate the working status of each jack.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for providing power to more than one ultrasonic welding probe from a single power supply comprising:
    a multiple probe controller having a first jack for connection to a first ultrasonic welding probe and a second jack for connection to a second ultrasonic welding probe;
    at least one programmable logic component provided within said multiple probe controller for detecting the power status of said first ultrasonic welding probe and said second ultrasonic welding probe and further for generating a first ultrasonic welding probe status signal and a second ultrasonic welding probe status signal; and a relay for switching said power supply between supplying power to said first probe and said second probe in response to said first ultrasonic welding probe status signal and said second ultrasonic welding probe status signal.

2. The system of claim 1 wherein said relay is enabled to switch power to one of said first probe and said second probe only when both said first ultrasonic welding probe status signal and said second ultrasonic welding probe status signal indicate that respective ones of said ultrasonic welding probes are not powered.

3. The system of claim 1 wherein said multiple probe controller is adapted to provide power to said second ultrasonic welding probe after receipt of said first ultrasonic welding probe status signal indicating that said first ultrasonic welding probe has terminated operation.

4. The system of claim 1 wherein said multiple probe controller is provided in a separate chassis from an ultrasonic generator for generating said power.

5. The system of claim 1 wherein said relay for switching said power supply is provided within said multiple probe controller.

6. A method for providing power to more than one ultrasonic welding probe comprising:

monitoring the power status of at least a first ultrasonic welding probe and a second ultrasonic welding probe;

generating a first ultrasonic welding probe power status signal indicating the power status of said first ultrasonic welding probe and a second ultrasonic welding probe power status signal indicating the power status of said second ultrasonic welding probe;

providing power to said first ultrasonic welding probe such that said first ultrasonic welding probe power status signal indicates said first ultrasonic welding probe is powered;

receiving a signal to switch from providing power to said first ultrasonic welding probe to providing power to said second ultrasonic welding probe;

terminating the provision of power to said first ultrasonic welding probe;

monitoring said first ultrasonic welding probe power status signal; and initiating the provision of power to said second ultrasonic welding probe when said first ultrasonic welding probe power status signal indicates that said first ultrasonic welding probe is no longer powered;

wherein generating said first ultrasonic welding probe power status signal comprises generating said first ultrasonic welding probe power status signal at an ultrasound voltage sense circuit.

7. The method of claim 6 wherein receiving a signal to switch from providing power to said first ultrasonic welding probe to providing power to said second ultrasonic welding probe comprises receiving said signal from an automation control system.

8. The method of claim 6 wherein receiving a signal to switch from providing power to said first ultrasonic welding probe to providing power to said second ultrasonic welding probe comprises receiving said signal from a manual selector input device.

9. The method of claim 6 wherein monitoring said first ultrasonic welding probe power status signal comprises monitoring said first ultrasonic welding probe power status signal at a programmable logic device.

10. The method of claim 9 wherein monitoring said first ultrasonic welding probe power status signal at said programmable logic device comprises monitoring said power status signal using multiple probe controller state logic executed by said programmable logic device.

11. The method of claim 6 further comprising generating a clock signal for providing time-based control of said provision of said initiation of provision of power to said second ultrasonic welding probe, and further for providing time-based control of said monitoring of said first ultrasonic welding probe power status signal.

12. A system for providing power from one ultrasonic welding power supply to a plurality of ultrasonic welding probes comprising:

a generator generating ultrasonic power;

a selector input device having an ultrasound activation output emitting an ultrasound activation signal to request initiation of provision of power by said generator and further having a probe selection output outputting a probe selection signal; and a multiple probe controller having at least two ultrasonic welding probes attached thereto, said multiple probe controller accepting ultrasonic probe selection signals from said probe selection output of said selector input device and providing power from said generator to one of said at least two ultrasonic welding probes based on said ultrasonic welding probe selection signals;

wherein said multiple probe controller is adapted to monitor power to said at least two ultrasonic welding probes and is adapted to change the provision of power from one of said at least two ultrasonic welding probes to the other of said at least two ultrasonic welding probes only when power to a powered ultrasonic welding probe has been terminated and the power supplied to said powered ultrasonic welding probe has proceeded through a ring-down period.

13. The system of claim 12 wherein said ring-down period corresponds to a ring-down status for said powered probe during which said powered probe is ceasing operation and said ring-down status is monitored by an ultrasound voltage sense circuit of said multiple probe controller.

14. The system of claim 12 wherein said multiple probe controller is provided with a clock for synchronizing ultrasonic probe control logic within said multiple probe controller.

15. The system of claim 12 wherein said multiple probe controller controls the provision of power to said ultrasonic welding probes via relays.

16. The system of claim 15 wherein said multiple probe controller comprises a programmable logic device for executing ultrasonic probe control logic and forwarding relay control signals to said relays.

17. The system of claim 16 wherein said relay control signals are provided to a relay coil driver circuit, which in turn activates said relays.

18. The system of claim 17 further comprising a coil driver fault detection circuit adapted to monitor said relay coil driver circuit and to send a fault signal to said programmable logic device when a fault is detected within said relay coil driver circuit.

19. A system for providing power to more than one ultrasonic welding probe from a single power supply comprising:

a multiple probe controller having a first jack for connection to a first ultrasonic welding probe and a second jack for connection to a second ultrasonic welding probe;

at least one programmable logic component provided within said multiple probe controller for detecting the power status of said first ultrasonic welding probe and said second ultrasonic welding probe and further for generating a first ultrasonic welding probe status signal and a second ultrasonic welding probe status signal; and a relay for switching said power supply between supplying power to said first port and said second port in response to said first ultrasonic welding probe status signal and said second ultrasonic welding probe status signal;

wherein said multiple probe controller is provided in a separate chassis from an ultrasonic generator for generating said power.

20. The system of claim 19, wherein the at least one programmable logic component is adapted to change the provision of power from said first ultrasonic welding probe to said second ultrasonic welding probe only when power to said first ultrasonic welding probe has been terminated and said first ultrasonic welding probe has proceeded through a ring-down period.

21. The system of claim 1, wherein the at least one programmable logic component is adapted to change the provision of power from said first ultrasonic welding probe to said second ultrasonic welding probe only when power to said first ultrasonic welding probe has been terminated and said first ultrasonic welding probe has proceeded through a ring-down period.

22. A method for providing power to more than one ultrasonic welding probe comprising:

monitoring the power status of at least a first ultrasonic welding probe and a second ultrasonic welding probe;

generating a first ultrasonic welding probe power status signal indicating the power status of said first ultrasonic welding probe and a second ultrasonic welding probe power status signal indicating the power status of said second ultrasonic welding probe;

providing power to said first ultrasonic welding probe such that said first ultrasonic welding probe power status signal indicates said first ultrasonic welding probe is powered;

receiving a signal to switch from providing power to said first ultrasonic welding probe to providing power to said second ultrasonic welding probe;

terminating the provision of power to said first ultrasonic welding probe;

monitoring said first ultrasonic welding probe power status signal; and initiating the provision of power to said second ultrasonic welding probe when said first ultrasonic welding probe power status signal indicates that said first ultrasonic welding probe is no longer powered and has proceeded through a ring-down period;

wherein generating said first ultrasonic welding probe power status signal comprises generating said first ultrasonic welding probe power status signal at an ultrasound voltage sense circuit.

* * * * *